United States Patent [19]

Engelhardt et al.

[11] Patent Number: 5,082,059
[45] Date of Patent: Jan. 21, 1992

[54] USE OF HYDROCARBON-RICH GELS AS FRACTURING FLUIDS

[75] Inventors: Friedrich Engelhardt, Frankfurt am Main; Gerlinde Ebert, Dreieich/Offenthal, both of Fed. Rep. of Germany

[73] Assignee: Cassella Aktiengesellschaft, Frankfurt am Main, Fed. Rep. of Germany

[21] Appl. No.: 601,269

[22] Filed: Oct. 22, 1990

[30] Foreign Application Priority Data

Oct. 28, 1989 [DE] Fed. Rep. of Germany ....... 3935999

[51] Int. Cl.$^5$ .............................................. E21B 43/26
[52] U.S. Cl. .................... 166/308; 252/8.551
[58] Field of Search ................ 166/271, 308; 252/8.551

[56] References Cited

U.S. PATENT DOCUMENTS

| | | | |
|---|---|---|---|
| 2,668,098 | 2/1954 | Alm | 166/308 |
| 2,724,439 | 11/1955 | Brainerd, Jr. | 166/308 |
| 2,801,218 | 7/1957 | Menaul | 166/308 X |
| 3,070,165 | 12/1962 | Stratton | 166/308 X |
| 3,601,198 | 8/1971 | Ahearn et al. | 166/308 |
| 4,200,540 | 4/1980 | Burnham | 166/308 X |
| 4,316,810 | 2/1982 | Burnham | 166/308 X |
| 4,828,034 | 5/1989 | Constien et al. | 166/308 |

*Primary Examiner*—George A. Suchfield
*Attorney, Agent, or Firm*—Connolly and Hutz

[57] ABSTRACT

The present invention relates to the use of hydrocarbon-rich gels as fracturing fluids and also to fracturing fluids which are composed of a hydrocarbon-rich gel and an auxiliary.

5 Claims, No Drawings

USE OF HYDROCARBON-RICH GELS AS FRACTURING FLUIDS

Hydraulic fracturing technology is of growing importance for the improvement of crude oil and natural gas yields during production from crude oil and natural gas reservoirs.

Fracturing treatments are carried out starting from the production well, the fundamental features of this process being that viscoelastic liquids which may be oil- or water-soluble are injected under high pressure, optionally with the addition of auxiliaries, this bringing about fracturing of the oil- or gas-producing formation. During this process, the viscoelastic liquid acting as the carrier for the auxiliary is forced into the resulting cracks and by this means the permeability of the reservoir rock is increased.

After removal of the fracturing fluid the cracks which have been formed are kept open by the auxiliary which remains, this giving a drastic increase in the oil or gas flow to the production well.

Oil-based frac systems must be used if the reservoir rock contains water-sensitive mineral components such as, for example, clays, which in the presence of water can lead by swelling to reservoir damage, i.e. reduction in permeability.

A hydrocarbon-rich gel is understood to mean a system which is composed of polyhedra formed from surfactant, these polyhedra being filled with hydrocarbon, and water forming a continuous phase in the narrow interstices between the polyhedra. Systems of this type are known and described in Angew. Chem. 100 933 (1988) and Ber. Bunsenges. Phys. Chem. 92 1158 (1988).

Surprisingly, it has now been found that these hydrocarbon-rich gels are eminently suitable as fracturing fluids in the tertiary recovery of crude oil and natural gas.

The present invention accordingly provides the use as fracturing fluids of hydrocarbon-rich gels which are composed of 50 to 99.5% by weight of hydrocarbon, 0.01 to 15% by weight of surfactant and 0.49 to 35% by weight of water.

The hydrocarbon-rich gels are preferably composed of 80 to 99.5% by weight of hydrocarbon, 0.01 to 5% by weight of surfactant and 0.49 to 15% by weight of water.

The hydrocarbon-rich gels are particularly preferably composed of 85 to 99.3% by weight of hydrocarbon, 0.01 to 1% by weight of surfactant and 0.69 to 14% by weight of water, based on the weight of the gel.

Examples of hydrocarbon components present in the hydrocarbon-rich gels are saturated or unsaturated aliphatics or aromatics. Also suitable are hydrocarbon mixtures in any desired ratio.

Preferred hydrocarbons are n-pentane, n-hexane, n-heptane, n-octane, n-nonane, n-decane, n-dodecane, n-tetradecane, n-hexadecane, cyclohexane, cyclooctane, benzene, toluene, kerosine, gasoline, lead-free gasoline and diesel oil.

The surfactant components present in the hydrocarbon-rich gels are preferably surfactants having a chain length of the aliphatic (hydrophobic) molecular component of 4 to 20 carbon atoms, it being possible for the hydrophilic head group to be anionic, cationic or else non-ionic.

Particularly preferred surfactants are the compounds of the following structures:

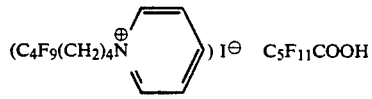

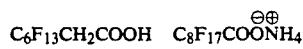

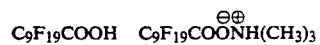

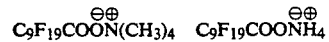

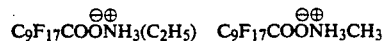

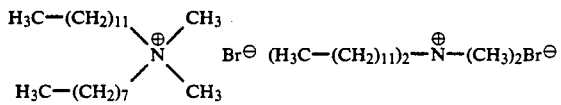

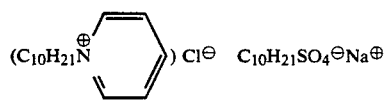

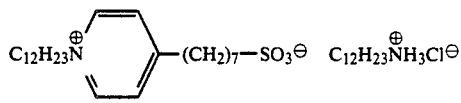

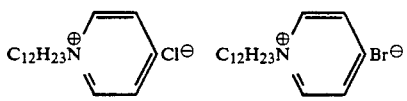

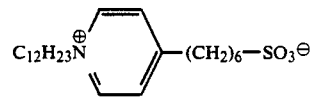

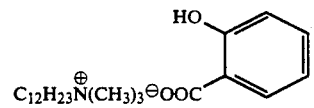

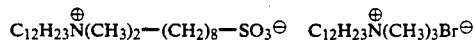

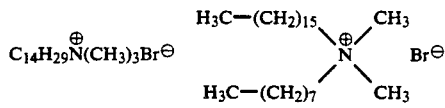

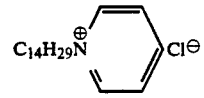

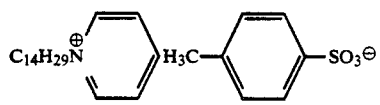

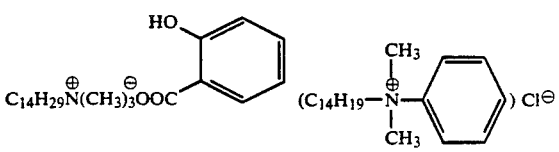

-continued

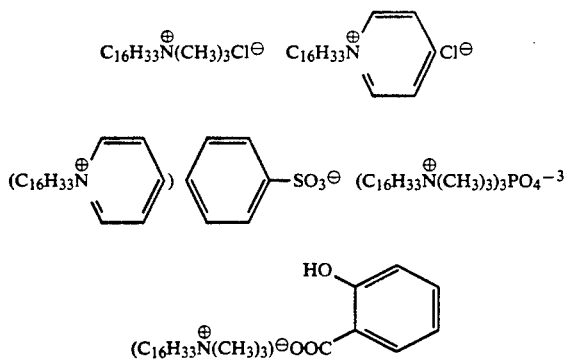

Most particularly preferred surfactants are

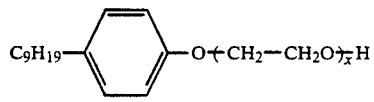

where x=8, 9, 10, 11, 13, 15, 23, 30 and

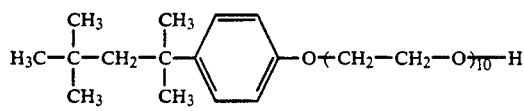

The hydrocarbon-rich gels used as fracturing fluids preferably contain auxiliaries.

The present invention accordingly also provides fracturing fluids which are composed of
a) 40 to 99.9% by weight of a hydrocarbon-rich gel containing 50 to 99.9% by weight of hydrocarbon, 0.01 to 15% by weight of surfactant and 0.49 to 35% by weight of water and
b) 0.1 to 60% by weight of an auxiliary, based on the weight of the fluid.

Preferred fracturing fluids are composed of 45 to 55% by weight of hydrocarbon-rich gel and 45 to 55% by weight of auxiliary. In preferred fracturing fluids, the hydrocarbon-rich gel contains 80 to 99.5% by weight of hydrocarbon, 0.01 to 5% by weight of surfactant and 0.49 to 15% by weight of water.

In particularly preferred fracturing fluids, the hydrocarbon-rich gel contains 85 to 99.3% by weight of hydrocarbon, 0.01 to 1% by weight of surfactant and 0.69 to 14% by weight of water.

The auxiliaries are, in particular, those known to a person skilled in the art and customarily used in hydrocarbons production technology. Preference is given to sand and bentonites.

The hydrocarbon-rich gels can be prepared by the process given in Ber. Bunsenges. Phys. Chem. 92 1158 (1988). The fracturing fluids according to the invention can be prepared by mixing the hydrocarbon-rich gels with the appropriate amount of auxiliary.

The hydrocarbon-rich gels or the fracturing fluids according to the invention are eminently suitable for use in the production of crude oil and natural gas.

Oscillation measurements reveal a significant predominance of the elastic component over the viscous component. The hydrocarbon-rich gels have a viscosity, governed by the gel structure, which is high enough to achieve the required crack width for the transport and distribution of the auxiliary. As expected, the shear viscosity falls sharply with increasing shear rate.

Furthermore, a yield point can be detected by measurement. On deformation, the hydrocarbon-rich gels obey Hooke's law up to a certain deformation limit. Above this limit, the substance begins to flow and from then on has Newtonian behaviour. Limits of this type are understood to be yield points. This gives a clean and rapid removal of the decomposed fracturing fluids and a spontaneous influx of the reservoir medium (oil, gas). Moreover, substantially reduced friction is achieved on pumping the system through lines and also in the crack which has been formed. Likewise, clogging effects are avoided during crack formation. The flow curves obtained from plotting elasticity as a function of time (stress test) reveal that the systems have pseudoplastic behaviour. The values of shear stress are seen to increase with shear rate in the low shear rate range, followed by a plateau region in which the shear stress is virtually independent of the shear rate. Depending on the composition of the systems, the third section of the curve reveals a spontaneous drop which results from breakdown of the gel structure. Flow curves of this type indicate an exceptional shear stability of the systems on use in fracturing fluids. Rheological measurements as a function of the temperature reveal an exceptionally good thermostability of the systems in the range between $-20°$ and $120°$ C., preferably in the range between $2°$ C. and $80°$ C. This is a surprising result considering the high vapour pressure of the hydrocarbon component.

The following Examples give particularly suitable hydrocarbon-rich gels (the % by weight are based on the weight of the gel):

| Example | Surfactant | Hydrocarbon | HC (% by weight) | Surfactant (% by weight) | H₂O (% by weight) |
|---|---|---|---|---|---|
| 1 | [C₄F₉(CH₂)₄—N⊕⟨pyridine⟩] I⁻ | pentane | 98.5 | 0.6 | 0.9 |
| 2 | " | hexane | 97.3 | 0.6 | 2.1 |
| 3 | " | heptane | 95.3 | 1.4 | 3.3 |
| 4 | " | octane | 89.4 | 2.3 | 8.3 |
| 5 | C₅F₁₁COOH | toluene | 85.7 | 5.6 | 8.7 |
| 6 | " | heptane | 95.3 | 0.4 | 4.3 |
| 7 | " | nonane | 74.5 | 5.0 | 20.5 |

-continued

| Example | Surfactant | Hydrocarbon | HC (% by weight) | Surfactant (% by weight) | H$_2$O (% by weight) |
|---|---|---|---|---|---|
| 8 | " | decane | 82.4 | 2.1 | 15.5 |
| 9 | C$_6$F$_{13}$CH$_2$COOH | pentane | 92.4 | 2.5 | 5.1 |
| 10 | " | hexane | 90.8 | 1.4 | 7.8 |
| 11 | " | cyclohexane | 84.2 | 4.3 | 11.5 |
| 12 | " | heptane | 95.4 | 0.8 | 3.8 |
| 13 | C$_8$F$_{17}$COO$^\ominus$NH$_4^\oplus$ | pentane | 95.6 | 1.2 | 3.2 |
| 14 | " | octane | 64.5 | 6.2 | 29.3 |
| 15 | " | nonane | 83.2 | 3.1 | 13.7 |
| 16 | " | dodecane | 72.4 | 2.6 | 25.0 |
| 17 | " | tetradecane | 63.2 | 2.5 | 34.3 |
| 18 | " | hexadecane | 65.1 | 2.8 | 32.1 |
| 19 | C$_9$F$_{19}$COOH | hexane | 79.6 | 4.9 | 15.5 |
| 20 | " | heptane | 73.8 | 2.9 | 23.3 |
| 21 | " | octane | 75.3 | 4.8 | 19.9 |
| 22 | " | decane | 83.2 | 2.9 | 13.9 |
| 23 | " | toluene | 71.2 | 5.0 | 23.8 |
| 24 | " | gas oil | 64.8 | 2.7 | 32.5 |
| 25 | C$_9$F$_{19}$COO$^\ominus$$^\oplus$NH(CH$_3$)$_3$ | hexane | 92.5 | 2.6 | 4.9 |
| 26 | " | cyclohexane | 97.9 | 0.4 | 1.7 |
| 27 | " | heptane | 95.6 | 0.6 | 3.8 |
| 28 | " | octane | 63.5 | 6.2 | 30.3 |
| 29 | C$_9$F$_{19}$COO$^\ominus$$^\oplus$N(CH$_3$)$_4$ | hexane | 86.7 | 3.1 | 10.2 |
| 30 | " | heptane | 83.4 | 2.8 | 13.8 |
| 31 | C$_9$F$_{19}$COO$^\ominus$$^\oplus$N(CH$_3$)$_4$ | octane | 92.5 | 2.1 | 5.4 |
| 32 | " | dodecane | 65.8 | 2.7 | 31.5 |
| 33 | C$_9$F$_{19}$COO$^\ominus$$^\oplus$NH$_4$ | cyclooctane | 78.4 | 4.8 | 16.8 |
| 34 | " | decane | 76.4 | 4.7 | 18.9 |
| 35 | " | naphtha | 84.5 | 3.2 | 12.3 |
| 36 | " | dodecane | 66.2 | 5.3 | 28.5 |
| 37 | C$_9$F$_{17}$COO$^\ominus$$^\oplus$NH$_3$(C$_2$H$_5$) | hexane | 86.3 | 2.5 | 11.2 |
| 38 | " | heptane | 93.2 | 0.8 | 6 |
| 39 | " | benzene | 66.2 | 5.3 | 28.5 |
| 40 | " | dodecane | 86.2 | 2.4 | 11.4 |
| 41 | C$_9$F$_{17}$COO$^\ominus$$^\oplus$NH$_3$CH$_3$ | hexane | 98.4 | 0.8 | 0.8 |
| 42 | " | heptane | 95.3 | 0.6 | 4.1 |
| 43 | " | octane | 84.3 | 2.6 | 13.1 |
| 44 | " | dodecane | 68.9 | 6.2 | 24.9 |
| 45 | " | benzene | 63.4 | 5.2 | 31.4 |
| 46 | [C$_{10}$H$_{21}$—N$^\oplus$(pyridine)] Cl$^\ominus$ | pentane | 94.5 | 0.6 | 4.9 |
| 47 | " | heptane | 96.5 | 0.6 | 2.9 |
| 48 | " | octane | 84.8 | 2.9 | 12.3 |
| 49 | " | cyclooctane | 78.3 | 9.4 | 12.3 |
| 50 | " | toluene | 81.0 | 4.9 | 14.1 |
| 51 | C$_{10}$H$_{21}$SO$_4^\ominus$Na$^\oplus$ | hexane | 98.4 | 0.5 | 1.1 |
| 52 | " | heptane | 96.2 | 0.7 | 3.1 |
| 53 | " | decane | 83.4 | 2.9 | 13.7 |
| 54 | " | dodecane | 82.4 | 2.9 | 14.7 |
| 55 | " | tetradecane | 79.4 | 3.2 | 17.4 |
| 56 | C$_{12}$H$_{23}$—N$^\oplus$(pyridine)—(CH$_2$)$_7$—SO$_3^\ominus$ | heptane | 79.6 | 4.9 | 15.5 |
| 57 | " | octane | 84.2 | 2.9 | 12.9 |
| 58 | " | nonane | 82.3 | 2.2 | 15.5 |
| 59 | C$_{12}$H$_{23}$—N$^\oplus$(pyridine)—(CH$_2$)$_7$—SO$_3^\ominus$ | decane | 79.5 | 4.2 | 16.3 |
| 60 | " | toluene | 67.8 | 7.1 | 25.1 |
| 61 | C$_{12}$H$_{23}^\oplus$NH$_3$Cl$^\ominus$ | hexane | 97.5 | 0.5 | 2.0 |
| 62 | " | heptane | 95.6 | 1.4 | 3.0 |
| 63 | " | octane | 83.5 | 2.9 | 13.6 |
| 64 | " | decane | 83.4 | 3.3 | 13.3 |
| 65 | " | dodecane | 69.5 | 7.3 | 23.2 |

-continued

| Example | Surfactant | Hydrocarbon | HC (% by weight) | Surfactant (% by weight) | H₂O (% by weight) |
|---|---|---|---|---|---|
| 66 | 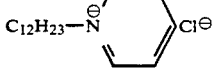 C₁₂H₂₃—N⁻(pyridine)—Cl⁻ | pentane | 87.5 | 2.6 | 9.9 |
| 67 | " | hexane | 67.4 | 7.6 | 25.0 |
| 68 | " | toluene | 61.4 | 7.0 | 31.6 |
| 69 | " | naphtha | 65.8 | 6.0 | 28.2 |
| 70 | 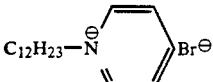 C₁₂H₂₃—N⁻(pyridine)—Br⁻ | hexane | 78.9 | 5.2 | 15.9 |
| 71 | " | nonane | 86.5 | 2.9 | 10.6 |
| 72 | " | benzene | 76.4 | 3.2 | 20.4 |
| 73 | " | dodecane | 85.7 | 5.4 | 8.9 |
| 74 | " | heptane | 95.8 | 0.9 | 3.3 |
| 75 | 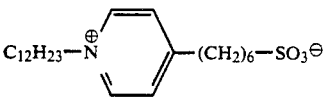 C₁₂H₂₃—N⁺(pyridine)—(CH₂)₆—SO₃⁻ | hexane | 97.8 | 0.1 | 2.1 |
| 76 | " | octane | 95.6 | 1.0 | 3.4 |
| 77 | " | nonane | 83.4 | 2.8 | 13.8 |
| 78 | " | tetradecane | 90.5 | 1.2 | 8.3 |
| 79 | " | lead-free gasoline | 89.2 | 2.1 | 8.7 |
| 80 | " | aviation gasoline | 66.3 | 4.8 | 28.9 |
| 81 | 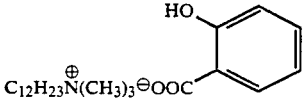 C₁₂H₂₃N⁺(CH₃)₃ ⁻OOC-C₆H₄-OH | hexane | 92.4 | 1.0 | 6.6 |
| 82 | " | pentane | 65.2 | 3.8 | 31.0 |
| 83 | " | decane | 76.7 | 3.0 | 20.3 |
| 84 | C₁₂H₂₃⁺N(CH₃)₂—(CH₂)₈—SO₃⁻ | heptane | 78.9 | 2.4 | 18.7 |
| 85 | " | octane | 85.5 | 5.3 | 9.2 |
| 86 | " | decane | 94.9 | 0.05 | 5.05 |
| 87 | " | hexadecane | 64.5 | 6.1 | 29.4 |
| 88 | C₁₂H₂₃⁺N(CH₃)₃Br⁻ | hexane | 98.04 | 0.02 | 1.94 |
| 89 | " | heptane | 84.2 | 1.2 | 14.6 |
| 90 | " | octane | 96.4 | 0.08 | 3.52 |
| 91 | C₁₂H₂₅OSO₃⁻Na⁺ | hexane | 82.3 | 2.2 | 15.5 |
| 92 | " | heptane | 90.5 | 1.2 | 8.3 |
| 93 | " | aviation gasoline | 89.2 | 2.0 | 8.8 |
| 94 | " | naphtha | 96.2 | 0.8 | 3.0 |
| 95 | C₁₄H₂₉⁺N(CH₃)₃Br⁻ | hexane | 97.86 | 0.04 | 2.1 |
| 96 | " | heptane | 74.3 | 3.4 | 22.3 |
| 97 | " | octane | 83.0 | 3.3 | 13.7 |
| 98 | " | dodecane | 79.7 | 4.8 | 15.5 |
| 99 | 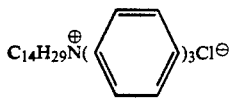 C₁₄H₂₉N⁺(C₆H₅)₃Cl⁻ | hexane | 82.1 | 2.4 | 15.5 |
| 100 | " | heptane | 74.3 | 3.4 | 22.3 |
| 101 | 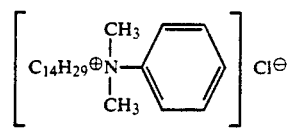 [C₁₄H₂₉⁺N(CH₃)₂-C₆H₅] Cl⁻ | hexane | 97.86 | 0.02 | 2.12 |
| 102 | " | heptane | 73.5 | 2.6 | 23.9 |
| 103 | " | decane | 65.2 | 2.7 | 32.1 |

-continued

| Example | Surfactant | Hydrocarbon | HC (% by weight) | Surfactant (% by weight) | H₂O (% by weight) |
|---|---|---|---|---|---|
| 104 | $C_{16}H_{33}\overset{\oplus}{N}(CH_3)_3Cl^{\ominus}$ | pentane | 96.5 | 0.6 | 2.9 |
| 105 | " | hexane | 98.34 | 0.02 | 1.64 |
| 106 | " | octane | 72.5 | 2.6 | 24.9 |
| 107 | $C_{16}H_{33}\overset{\oplus}{N}C_5H_5\ Cl^{\ominus}$ | hexane | 98.25 | 0.02 | 1.73 |
| 108 | " | decane | 79.7 | 4.8 | 15.5 |
| 109 | " | toluene | 90.6 | 1.4 | 8.0 |
| 110 | " | benzene | 95.2 | 0.5 | 4.3 |
| 111 | $[C_{16}H_{33}\overset{\oplus}{N}(CH_3)_3]_3PO_4^{3-}$ | octane | 96.25 | 0.04 | 3.71 |
| 112 | " | nonane | 82.5 | 2.1 | 15.4 |

What is claimed is:

1. Fracturing treatment of a subterranean formation via oil or gas wells comprising injecting fluids containing a hydrocarbon-rich gel comprising 50 to 99.5% by weight of hydrocarbon, 0.01 to 15% by weight of surfactant and 0.49 to 35% by weight of water based on the weight of the gel into the wells, wherein the surfactant is selected from the group consisting of $(C_4F_9(CH_2)_4\overset{\oplus}{N}C_5H_5)I^{\ominus}$   $C_5F_{11}COOH$ $C_6F_{13}CH_2COOH$   $C_8F_{17}CO\overset{\ominus}{O}\overset{\oplus}{N}H_4$ $C_9F_{19}COOH$   $C_9F_{19}CO\overset{\ominus}{O}\overset{\oplus}{N}H(CH_3)_3$ $C_9F_{19}CO\overset{\ominus}{O}\overset{\oplus}{N}(CH_3)_4$   $C_9F_{19}CO\overset{\ominus}{O}\overset{\oplus}{N}H_4$ $C_9F_{17}CO\overset{\ominus}{O}\overset{\oplus}{N}H_3(C_2H_5)$   $C_9F_{17}CO\overset{\ominus}{O}\overset{\oplus}{N}H_3CH_3$

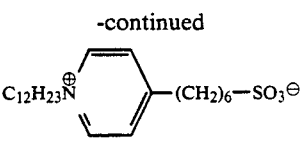

$(H_3C-(CH_2)_{11})_2-\overset{\oplus}{N}-(CH_3)_2Br^{\ominus}$ $(C_{10}H_{21}\overset{\oplus}{N}C_5H_5)Cl^{\ominus}$   $C_{10}H_{21}SO_4^{\ominus}Na^{\oplus}$ $C_{12}H_{23}\overset{\oplus}{N}C_5H_5-(CH_2)_7-SO_3^{\ominus}$   $C_{12}H_{23}\overset{\oplus}{N}H_3Cl^{\ominus}$ $C_{12}H_{23}\overset{\oplus}{N}C_5H_5\ Cl^{\ominus}$   $C_{12}H_{23}\overset{\oplus}{N}C_5H_5\ Br^{\ominus}$ -continued $C_{12}H_{23}\overset{\oplus}{N}C_5H_5-(CH_2)_6-SO_3^{\ominus}$ $C_{12}H_{23}\overset{\oplus}{N}(CH_3)_3\ ^{\ominus}OOC\text{-}C_6H_4\text{-}OH$ $C_{12}H_{23}\overset{\oplus}{N}(CH_3)_2-(CH_2)_8-SO_3^{\ominus}$   $C_{12}H_{23}\overset{\oplus}{N}(CH_3)_3Br^{\ominus}$ $C_{14}H_{29}\overset{\oplus}{N}(CH_3)_3Br^{\ominus}$   $H_3C-(CH_2)_{15}\underset{H_3C-(CH_2)_7}{\overset{CH_3}{\underset{CH_3}{\overset{|}{\underset{|}{N^{\oplus}}}}}}Br^{\ominus}$ $C_{14}H_{29}\overset{\oplus}{N}C_5H_5\ Cl^{\ominus}$ $C_{14}H_{29}\overset{\oplus}{N}C_5H_5\ H_3C\text{-}C_6H_4\text{-}SO_3^{\ominus}$ $C_{14}H_{29}\overset{\oplus}{N}(CH_3)_3\ ^{\ominus}OOC\text{-}C_6H_4\text{-}OH$ $(C_{14}H_{29}-\overset{\underset{|}{CH_3}}{\underset{\underset{|}{CH_3}}{N^{\oplus}}}-C_6H_5)Cl^{\ominus}$ $C_{16}H_{33}\overset{\oplus}{N}(CH_3)_3Cl^{\ominus}$   $C_{16}H_{33}\overset{\oplus}{N}C_5H_5\ Cl^{\ominus}$ -continued

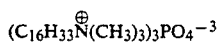

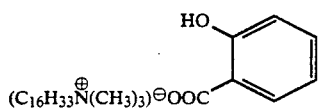

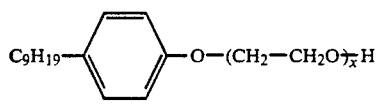

where x = 8, 9, 10, 11, 13, 15, 23, 30 and

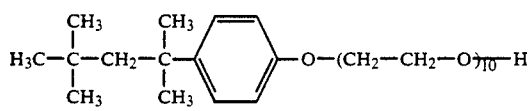

2. Fracturing treatment according to claim 1, wherein the hydrocarbon-rich gel comprises 80 to 99.5% by weight of hydrocarbon, 0.01 to 5% by weight of surfactant and 0.49 and 15% by weight of water.

3. Fracturing treatment according to claim 1 wherein the hydrocarbon-rich gel comprises 85 to 99.3% by weight of hydrocarbon, 0.01 to 1% by weight of surfactant and 0.69 to 14% by weight of water.

4. Fracturing treatment according to claim 1 wherein the hydrocarbon is n-pentane, n-hexane, n-heptane, n-octane, n-nonane, n-decane, n-dodecane, n-tetradecane, n-hexadecane, cyclohexane, cyclooctane, benzene, toluene, kerosine, gasoline, lead-free gasoline or diesel oil.

5. Fracturing treatment according to claim 1, wherein the surfactant is selected from the group consisting of

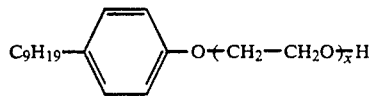

where x = 8, 9, 10, 11, 13, 15, 23, 30 and

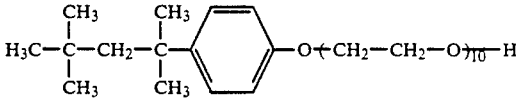

* * * * *